Figure 1:
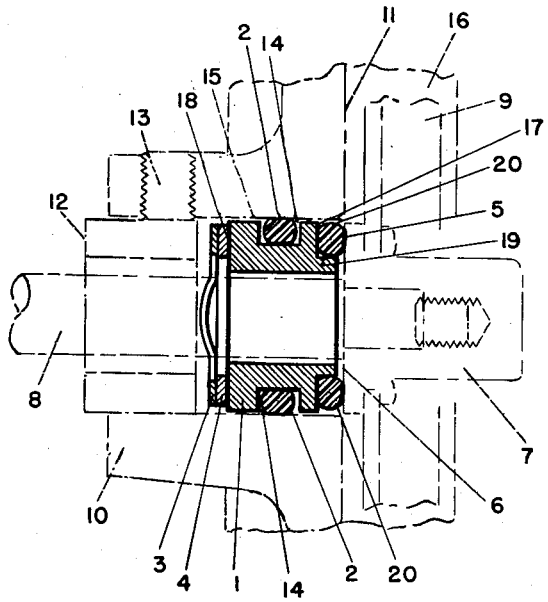

Oct. 12, 1954     H. G. CHENOWETH     2,691,542

ROTARY SHAFT SEAL

Filed Feb. 15, 1950

INVENTOR.
HENRY G. CHENOWETH
BY Edward H. Eames
ATTORNEY.

Patented Oct. 12, 1954

2,691,542

UNITED STATES PATENT OFFICE 2,691,542

ROTARY SHAFT SEAL

Henry G. Chenoweth, Northford, Conn., assignor to Eastern Industries, Incorporated, East Norwalk, Conn., a corporation of Delaware Application February 15, 1950, Serial No. 144,225

6 Claims. (Cl. 288—2)

This invention relates to a seal for rotary shafts and more particularly to a mechanical type seal providing a resilient radial sealing surface for engaging another radial sealing surface on the shaft or on a member attached to the shaft for relative rotation between such surfaces under sealing pressure.

It is already well known to have mechanical type rotary seals with carbon composition or other relatively rigid material as a radial sealing surface on an end-face for sealing against another highly finished metallic radial surface for relative motion between the surfaces under pressure to prevent the passage of fluids. Such seals are widely used for example in rotary pumps between the pump housing and the hub of an impeller element on a rotating shaft. Such mechanical type rotary seals of the prior art have a highly finished flat surface such as a lapped finish on the radial sealing surface. However, it has been found that such relatively rigid sealing surfaces, even though finely finished to provide an extremely close fit between the surfaces, are not satisfactory for certain types of fluids such as liquids of extremely low viscosity or surface tension and liquids containing abrasives. The low viscosity silicone liquids are examples of the first class which have proved a major problem for rotary seals by seeping between the sealing surfaces. A water suspension of fine grain abrasives used as a filter aid in chemical processing is an example of an abrasive liquid which has presented a major sealing problem since it rapidly wears the sealing surfaces and destroys the effectiveness of the rotary seal, with a non-resilient surface.

I have found that the use of a ring of flexible rubber-like material, impervious to the sealed fluid, as the sealing surface on the end face of the rotary seal body, will serve to seal effectively either low viscosity silicone oil or liquids containing abrasives, thus solving both of these sealing problems. With this seal it has also been found that it is not necessary to provide any highly finished surface on the end face of the seal body.

In its preferred form according to the invention the seal comprises a generally cylindrical rigid body with an end face sealing surface of rubber or other resilient material, as for example an O ring, the body having an axial hole for free passage of a rotating shaft, the end face resilient sealing surface being designed to cooperate with a radial sealing surface on the member to be sealed for relative rotation between such surfaces.

According to one aspect of the invention the seal body is provided with a sealing surface of rubber or other resilient material at one end at right angles to the axis, and sealing pressure is obtained by a compression spring at the opposite end of the body exerting an axial force on the body, and the body is provided with an annular groove in its outer cylindrical surface between its two ends to accommodate the usual resilient O ring, which is seated in this groove and has an outer diameter slightly greater than the outer diameter of the body so as to be compressed by insertion of the seal into the cylindrical bore of housing with respect to which the shaft member is sealed.

In one form of the invention the end face sealing surface is provided by means of a resilient graphite-rubber or rubber O ring on the end face of the seal body to provide a resilient fine-grained sealing surface against the cooperating rigid radial flat sealing surface on the hub to be sealed, the latter being ordinarily metallic. This end seal O ring may be slightly stretched over a hub-like extension of the end face of the seal body or may be seated in a groove or recess in the end face, the ring remaining fixed against rotation with respect to the seal body and a part of the outer surface of the ring serving as the sealing surface.

It is a general object of the invention to provide an improved rotary shaft seal of simplified construction, and which will seal liquids containing abrasive material.

It is a further general object of the invention to provide an improved rotary shaft seal of simplified construction for sealing liquids of low viscosity or low surface tension.

It is also an object of the invention to provide an improved rotary shaft seal of the mechanical seal type having a radial end-face sealing surface in which such sealing surface is provided by a resilient rubber-like material.

It is another object of the invention to provide an improved rotary shaft seal including a hollow generally cylindrical body of substantially rigid character with an end face having an annular recess and a ring of resilient rubber-like material seated in said recess and projecting axially therefrom to provide a resilient sealing surface in a radial plane.

It is also an object of the invention to provide a rotary shaft seal for use in a substantially cylindrical bore of a housing and employing a generally cylindrical body providing an annular recess in one end surface with a resilient end sealing ring seated in said recess, and projecting axially therefrom, said body providing an annular groove in its outer cylindrical surface with a second resilient sealing ring seated in said groove and projecting radially therefrom, and with an axial hole through said body for free passage of the shaft, and a compression spring member coaxial with the shaft for exerting pressure between the other end of the body and one end of the housing, or a stop member fixed in such housing, to maintain sealing pressure of the resilient sealing ring at the other end of said body against a sealing surface on the rotating shaft memember.

Figure 2:
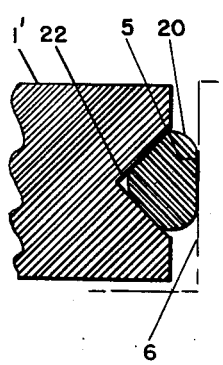
Figure 3:
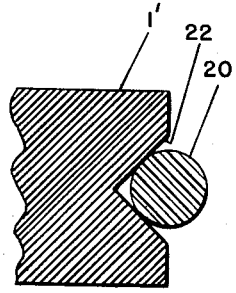

Reference may now be had to the drawings in which Fig. 1 shows a generally cross-section view of the seal in operating position between a rotary shaft and a stationary housing according to one form of the invention, Fig. 2 shows a sectional partial view of the upper right hand half of the seal in operating position according to an alternate form of the invention, and Fig. 3 shows another partial view of the form of the seal as in Fig. 2 except that it shows the resilient end sealing ring in uncompressed form.

In its fully assembled preferred form in position for use between the shaft and the housing the seal includes principally the seal body 1, a main resilient sealing ring 20 at the right end of the body and providing a working sealing surface at its right edge, a second resilient sealing ring 2, sometimes referred to in the art as an O ring, seated in a slot in the outer cylindrical surface of the body and a compression spring 3 at the left end of the body.

In its preferred form the body 1 provides a substantially radial surface at the right hand end a part of which surface is recessed to provide a groove or recess 17 in which is seated a sealing ring 20 of resilient sealing material impervious to the liquid to be sealed. In the form shown in Fig. 1 this recess is provided by having the inner radial part of the end face project from the remainder of the end face to form a hub-like projection 19 on which the sealing ring is fitted by stretching the ring slightly, the ring having in its normal unstretched condition an inner diameter slightly less than the outer diameter of the hublike projection 19.

The outer face or right hand face of this sealing ring 20, shown in the form of an O ring, provides a resilient sealing surface 5 for engaging a corresponding sealing surface 6 on the hub 7 attached to the shaft 8. In the form shown in Fig. 1 a washer 4 is inserted between the spring 3 and the left end surface 18 of the body 1. This washer may be of metal, plastic, rubber or other suitable material for this purpose, and may also be used if desired to distribute the spring pressure or otherwise protect the left end face of the body.

The hub 7 is shown in phantom as attached to or forming a part of a pump impeller 9 for example which is also shown in phantom. Also in the phantom view the housing 10 may represent the housing of a rotary pump for example, and is shown largely in section. The face 11 of the housing may represent the inner face serving as a wall of a chamber 16 in which the impeller 9 rotates on the shaft 8 to which it is attached by the hub 7. The hub 7 is attached to a threaded end part of the shaft 8 of reduced diameter and the hub bears against a shoulder on the shaft approximately in line with the sealing surface 6 on the hub. A stop 12 is also shown in the phantom view held in position in the cylindrical bore of the housing 10 by a set screw 13 or other suitable means, the stop having an axial clearance hole for the shaft 6. The spring 3 serves to provide pressure between the stop 12 and the seal body 1 to maintain sealing pressure between the sealing surface 5 on the body and the sealing surface 6 on the hub 7 which rotates with the shaft 8, for which a bearing (not shown) is assumed to be outside to the left of Fig. 1 for example.

The seal body 1 is of rigid construction and of generally cylindrical shape with an outer diameter providing a small clearance from the diameter of the bore of the housing 10 for which it is designed and with an axial hole providing substantial clearance for the passage of the shaft 8. An annular groove 14 is formed in the outer cylindrical surface of the body 1 preferably midway between the two end faces of the body. This groove 14 accommodates the O ring 2. This O ring is of resilient material such as a rubberlike material for example, and is preferably of generally circular cross-section in uncompressed form, with a slightly greater cross-section diameter than the depth of the groove 14. The groove 14 has a greater axial width than the cross-section diameter of the O ring to provide space for the expansion of the O ring axially when compressed by the inner cylindrical wall 15 of the housing 10 forming a chamber which contains the seal body and O ring assembly.

The outer diameter of the O ring 2, when assembled against the bottom of the groove 14, is greater than the inner diameter of the cylindrical chamber so as to compress the O ring between the cylindrical chamber and the bottom of the groove. This compression of the O ring provides a seal between the stationary body 1 and the stationary cylindrical chamber wall 15 against the passage of fluid, which may be either liquid or gas, along the cylindrical chamber wall 15 of the bore of the housing 10 in which the seal operates.

In this figure the O ring 2 is shown approximately in a midposition in the groove 14 as it might appear with little or no pressure of fluid on either side of the seal, as for example when a pump is operating at very low pressures or when the pump shaft 8 is stationary or just starting to rotate at low pressure. However if the pump is operating at appreciable positive pressure in the pump chamber then the fluid will appear under pressure in the clearance space between the cylindrical wall 15 of the seal chamber and the outer diameter of the seal body 1 at the right side of the O ring 2, and if there is appreciable fluid pressure the O ring will be forced to the left in contact with the left wall of the groove 14 but in any case the pressure of the O ring between the bottom of the groove and the wall 15 of the chamber will prevent the passage of fluid beyond the O ring.

If on the other hand it is assumed that the shaft 8 and hub 7 are those of a vacuum pump then positive pressure will appear on the left side of the O ring and under any appreciable pressure from the left side the O ring would be forced to the right in contact with the right wall of the groove 14. It will therefore be appreciated that the position of the O ring as shown is illustrative of an intermediate or resting position for clearer illustration and it may assume a position against the left wall of the groove or against the right wall of the groove according to the operating pressure conditions as described.

It will be noted that in the form of the body 1 and sealing ring 20 illustrated, the sealing surface 5 on the outer face of the O ring extends only over a part of the radial distance between the outer and inner diameters of the body. With the type of seal illustrated it will be appreciated by those skilled in the art that if the seal is used against positive pressure of fluid in a pump chamber there will be some net fluid pressure tending to separate the sealing surfaces 5 and 6, although the amount of such net pressure will depend upon the operating pressure of the pump and the proportioning of the sealing surface and other surfaces of the seal body. However in the preferred form of the present simplified seal construction the spring 3 provides sufficient pressure to overcome any net pressure tending to separate the sealing surfaces at the maximum positive operating pressure of the pump for example for which the seal is designed.

The compression of the O ring 2 between the bore 15 and the bottom of the groove 14 also prevents rotation of the body 1 within the bore, through friction against the opposing walls, but permits axial motion through the sliding, flexing or rolling of the O ring at the bottom of the recess in the body and the inside wall of the bore to permit axial play within the cylindrical chamber. The resilience of the connection between the seal body and this wall 15 of the cylindrical chamber by means of the O ring permits the body to follow any minor irregularities in the operation of the rotating sealing face by allowing a slight rocking motion of the body.

The body 1 may be made of any suitable substantially rigid non-porous material, which will not corrode in the fluid to be sealed. Stainless steel or bronze may be employed for example.

It will also be understood that although a two wave spring is shown for convenience of illustration of the spring 3 for example this is merely illustrative and a three-wave spring may well be used or a coil spring may be used for example.

It will also be appreciated that the composition of either O ring may be of rubber or other resilient material such as a resilient pastic material substantially impervious to the penetration of the fluid for which the seal is designed. Although in the preferred form the cross-section of the O ring is illustrated as circular or oval for general application it will be appreciated that for some applications an O ring of more rectangular cross-section might be employed in either location. However an O ring of substantially circular or slightly oval cross-section provides for some rolling action which will be of particular value in the middle O ring 2.

It will be appreciated that the simplicity of design of the seal according to the invention, by which the spring is placed outside and away from direct contact with the fluid sealed under positive pressure and the only parts of the seal exposed to the fluid are the body and the O rings, makes this design of distinct advantage where exposure to corrosive fluids is involved and where the choice of materials may thus be limited.

The spring 3 may bear directly against the left hand end face of the seal body and this end face may be a single substantially radial surface or this end face may be partly recessed to provide a recessed radial surface to seat the compression spring against the body. In any case in a typical arrangement the spring is compressed between a stop member 12 in the housing for example and a part of the left face of the seal body 1.

Referring now to Figs. 2 and 3, illustrating another form of the right hand end face of the seal body 1 and the sealing ring these figures each show a cross-sectional view of the upper half of the right hand end face of the body and extending into the body a short distance and are in considerably enlarged form as compared with Fig. 1. In this alternative form the right hand end face of the body is provided with a V-shaped groove 22 in which the resilient sealing ring is seated. In the form illustrated this sealing ring is of the O ring type and is of sufficient diameter to project from the groove 22 when compressed under sealing pressure. Fig. 2 shows the O ring in its compressed form between the surfaces in the groove 22 the end face of the seal body 1' and the radial sealing face 6 of the hub 7 indicated partially in phantom. It will be appreciated that this is only a partial cross-section view of the sealing body 1' and the ring 20, the lower half of the body and ring (not shown) being symmetrical with respect to the upper half shown. It will be understood that the remainder of the seal body, to the left of the broken away portion of Fig. 2 and Fig. 3, may be of the same construction as shown in Fig. 1 for example.

Fig. 3 shows another view of the right hand end face of the seal body with a V type recess as in Fig. 2 and a sealing ring 20 as in Fig. 2, but shows the sealing ring in its uncompressed substantially circular form, before being compressed in its operating position unler sealing pressure as in Fig. 2.

Although the rotary shaft seal according to the invention has been shown in one preferred form as a complete seal assembly with a second O ring in a groove in the outer cylindrical surface of the body to seal against axial passage of the sealed fluid along the bore of the housing between the outer cylindrical surface of the seal body and this bore, it will be appreciated that the seal according to the invention, providing the right hand end face resilient radial sealing surface as a working sealing surface against a rotating part providing a cooperating radial sealing surface, could serve as a part of a more complex seal assembly in which the sealing of the bore of the housing against passage of fluid may be provided by a separate sealing member such as a separate body and one or more sealing rings for this purpose, in place of the O ring 2, the outer right hand face of the end face sealing ring 20 however providing the main working sealing surface as set forth above in accordance with the invention.

It will also be appreciated that an alterative arrangement for retaining the resilient sealing ring in the end face of the body 1 or 1' could be provided if desired by enlarging the recess in this end face near the base or maximum axial depth of such recess by undercutting the body at the sides of the recess or the like to provide a greater radial dimension for the recess at some part of its axial depth than its radial dimension at the end face of the body, and the resilient sealing ring could then be of a corresponding shape so as to be retained at all times in the recess but of sufficient axial dimension to project axially therefrom to provide the working rotary sealing surface. The recess could for example be of trapezoidal cross-section with its radial base at its maximum axial depth corresponding to the base of the trapezoid.

It will be further appreciated that the left hand face of the working end face sealing ring 20 could be of a substantially flat character and attached to the end face of the body or to the recessed surface in the recess in the end face of the body by adhesive material or by bonding or molding.

As a further alternate arrangement the resilient rubber type sealing ring could be combined with a seal body of relatively rigid rubber type material as a substantially integral combination if desired, employing a natural or synthetic rubber or similar plastic impervious to the fluid to be sealed.

It will be understood that either the recessed part 17 of the end face in Fig. 1 or the groove 22 in the end face in Figs. 2 and 3 may be referred to generally as a recess.

It has been found that one satisfactory combination for the working sealing surfaces according to the invention comprises a synthetic rubber with a relatively high carbon content for the resilient ring 20 and a standard type 303 stainless steel working face 6 on the cooperating sealing surface for example on the hub of the impeller as indicated in Fig. 1. The rubber may be of the type familiar to the art as used for the ordinary flexible O ring for sationary sealing surfaces as in the case of the O ring 2 in Fig. 1, for example. It has been found for example that this combination will greatly lengthen the life of the working seal surfaces when employed with a water suspension of a fine grained abrasive material and it has also been found that this combination will reduce the seepage of liquid past the working sealing surfaces to a negligible amount so as to provide a satisfactory seal in the pumping of Dow Silicone (DC200) oil.

It will be appreciated by those skilled in the art that other modifications of the parts or their arrangement may be made without departing from the spirit of the invention.

I claim:

1. A rotary shaft seal comprising a hollow generally cylindrical body providing clearance for axial passage of the shaft and having an inner hub-like projection extending axially from one radial end face, a ring of resilient rubber-like sealing material of curvilinear cross-section stretched over said hub-like projection so as to be retained on said body and against rotation with respect thereto and having an axial dimension greater than the axial dimension of said hub-like projection to provide a resilient radial sealing surface at its outer edge.

2. A rotary shaft seal as in claim 1 and including a compression spring at the opposite end face of said body to provide axial thrust of said body and ring toward its sealing surface to provide sealing pressure.

3. A rotary shaft seal as in claim 1 in which said body provides an annular groove in its outer cylindrical surface and in which the seal includes a second ring of resilient sealing material seated in said groove and projecting radially therefrom.

4. A rotary seal shaft comprising a hollow generally cylindrical body providing clearance for axial passage of the shaft and having an inner hub-like projection extending axially from one radial end face, a ring of resilient graphite-rubber sealing material of curvilinear cross-section stretched over said hub-like projection so as to be retained on said body and against rotation with respect thereto and having an axial dimension greater than the axial dimension of said hub-like projection to provide a resilient radial sealing surface as its outer edge.

5. A rotary shaft seal as in claim 4 and including a compression spring at the opposite end face of said body to provide axial thrust of said body and ring toward its sealing surface to provide sealing pressure.

6. A rotary shaft seal as in claim 4 in which said body provides an annular groove in its outer cylindrical surface and in which the seal includes a second ring of resilient sealing material seated in said groove and projecting radially therefrom.

References Cited in the file of this patent

UNITED STATES PATENTS

| Number | Name | Date |
| --- | --- | --- |
| Re. 22,353 | Karlberg | July 27, 1943 |
| 1,914,759 | Schwitzer et al. | June 20, 1933 |
| 2,185,554 | Janette | Jan. 2, 1940 |
| 2,363,110 | Krug | Nov. 21, 1944 |
| 2,373,443 | Armington | Apr. 10, 1945 |
| 2,405,464 | Storer, Jr. | Aug. 6, 1946 |
| 2,522,231 | Loftis | Sept. 12, 1950 |
| 2,575,549 | Doble | Nov. 20, 1951 |